(12) United States Patent
Wiklander et al.

(10) Patent No.: US 11,046,334 B2
(45) Date of Patent: Jun. 29, 2021

(54) ARRANGEMENT FOR DIFFERENTIATED CONTROL OF VEHICLES ON A WORK SITE

(71) Applicant: Volvo Construction Equipment AB, Eskilstuna (SE)

(72) Inventors: Jimmie Wiklander, Västerås (SE); Johan Sjöberg, Västerås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 16/462,100

(22) PCT Filed: Nov. 24, 2016

(86) PCT No.: PCT/SE2016/051165
§ 371 (c)(1),
(2) Date: May 17, 2019

(87) PCT Pub. No.: WO2018/097773
PCT Pub. Date: May 31, 2018

(65) Prior Publication Data
US 2020/0255032 A1    Aug. 13, 2020

(51) Int. Cl.
*B60W 60/00*    (2020.01)
*B60W 30/14*    (2006.01)
*G05D 1/02*    (2020.01)

(52) U.S. Cl.
CPC ...... *B60W 60/0025* (2020.02); *B60W 30/146* (2013.01); *G05D 1/028* (2013.01);
(Continued)

(58) Field of Classification Search
CPC .......... B60W 60/0025; B60W 30/146; B60W 2556/45; B60W 2300/17; B60W 2720/10;
(Continued)

(56) References Cited

U.S. PATENT DOCUMENTS 8,744,626 B2 * 6/2014 Johnson ............... G05D 1/0274
700/250
2001/0044697 A1  11/2001 Kageyama
(Continued)

FOREIGN PATENT DOCUMENTS

CA    2945922 A1    6/2016
EP    2476034 A2    7/2012
(Continued)

OTHER PUBLICATIONS

Extended European Search Report dated May 12, 2020 for European Patent Application No. 16922054.8, 11 pages.
(Continued)

*Primary Examiner* — Daryl C Pope
(74) *Attorney, Agent, or Firm* — Sage Patent Group

(57) ABSTRACT

An arrangement for a work site includes a radio transmitter arrangeable at the work site for transmitting signals receivable by a radio receiver arranged on a vehicle at the work site. The radio transmitter is arranged to define a work site zone of the work site by means of the coverage of the radio signals from the radio transmitter. A predetermined vehicle operation condition for the vehicle is different in the work site zone when receiving the radio signals compared to outside the work site zone when not receiving the radio signals.

11 Claims, 6 Drawing Sheets

(52) U.S. Cl.
CPC ....... *G05D 1/0291* (2013.01); *B60W 2300/17* (2013.01); *B60W 2556/45* (2020.02); *B60W 2720/10* (2013.01); *G05D 2201/021* (2013.01)

(58) Field of Classification Search
CPC ... B60W 60/001; G05D 1/028; G05D 1/0291; G05D 2201/021
USPC ................. 340/539.1, 539.11, 425.5, 539.13
See application file for complete search history.

(56) References Cited

U.S. PATENT DOCUMENTS

| | | | |
|---|---|---|---|
| 2002/0143461 A1 | 10/2002 | Burns et al. | |
| 2004/0199306 A1 | 10/2004 | Heilmann et al. | |
| 2005/0188493 A1 | 9/2005 | Uehigashi | |
| 2009/0118889 A1 | 5/2009 | Heino et al. | |
| 2010/0114405 A1* | 5/2010 | Elston | B66F 9/0755 701/2 |
| 2011/0295423 A1* | 12/2011 | Anderson | G05D 1/0088 700/248 |
| 2014/0214264 A1 | 7/2014 | Campagna et al. | |
| 2015/0241878 A1 | 8/2015 | Crombez et al. | |
| 2016/0092755 A1* | 3/2016 | Fairfield | G05D 1/0257 701/28 |
| 2016/0109551 A1 | 4/2016 | Faragher | |
| 2016/0271800 A1 | 9/2016 | Stubbs et al. | |
| 2016/0334798 A1 | 11/2016 | Foster et al. | |
| 2018/0182248 A1* | 6/2018 | Kanai | G08G 1/166 |

FOREIGN PATENT DOCUMENTS

| | | |
|---|---|---|
| FR | 2584197 A1 | 1/1987 |
| RO | 130446 | 7/2015 |

OTHER PUBLICATIONS

European Office Action dated Oct. 26, 2020 for European Patent Application No. 16922054.8, 6 pages.

International Search Report and Written Opinion of the International Searching Authority, PCT/SE/2016/051165, dated Aug. 25, 2017, 12pages.

* cited by examiner

ARRANGEMENT FOR DIFFERENTIATED CONTROL OF VEHICLES ON A WORK SITE

CROSS REFERENCE TO RELATED APPLICATIONS

This application is a 35 U.S.C. § 371 national stage application of PCT International Application No. PCT/SE2016/051165 filed on Nov. 24, 2016, the disclosure and content of which is incorporated by reference herein in its entirety.

TECHNICAL FIELD

The invention relates to an arrangement for a work site according to the preamble of claim 1, a device for controlling a vehicle on a work site according to the preamble of claim 9, a system for a work site according to the preamble of claim 15, a method for creating a work site zone on a work site according to the preamble of claim 18, and a method for controlling a vehicle on a work site according to the preamble of claim 19.

The invention is applicable on work sites, such as quarries, and vehicles on a work site, and particularly on work sites where autonomous machines, manually operated working machines and walking people are mixed. The autonomous machines can be haulers for transportation of boulders, gravel, sand, etc. Although the invention will be described with respect to autonomous haulers, the application of the invention is not restricted to this particular machine, but may also be used in other vehicles, such as any kind of dump trucks or loaders or other construction equipment.

BACKGROUND OF THE INVENTION

At many work sites the production is taken care of by autonomous machines or will be taken care of by autonomous machines in the future. When the work sites are automated, safety is of highest concern. At the same time, productivity is also very important which means that the vehicles on the work site have to be operated at sufficient speed. The relatively high speed of the autonomous machines sufficient for achieving the desired productivity may constitute a safety risk to the other vehicles and persons on the work site. It would therefore be desirable to have a cost effective solution to introduce increased safety at the work site.

SUMMARY OF THE INVENTION

An object of the invention is to provide an arrangement defined by way of introduction, which arrangement enables a differentiated control of vehicles on a work site. Such differentiated control can then be utilized for increasing safety at a work site while maintaining a high productivity, particularly when the vehicle fleet of the work site comprises autonomous vehicles.

According to a first aspect of the invention an arrangement according to claim 1 is provided. The above-mentioned object is achieved by such an arrangement.

By the provision of an arrangement where the radio transmitter is arranged to define a work site zone of the work site by means of the coverage of the radio signals from the radio transmitter, wherein a predetermined vehicle operation condition for the vehicle is different in the work site zone when receiving the radio signals compared to outside the work site zone when not receiving the radio signals, it is possible to differentiate the control of the vehicles, particularly autonomous vehicles, for different areas of the work site. This means that the vehicles can be driven or operated in one way within the work site zone, where only autonomous vehicles are permitted for instance, and in another way outside the work site zone, where autonomous vehicles and operator-controlled vehicles are mixed for instance. This arrangement gives advantages, since often the work site conditions require that a vehicle is controlled in one way in one area and in another way in another area of the work site. This will give a non-complicated and relatively inexpensive arrangement that is not dependent of any GPS or similar system for differentiating the conditions for the vehicles of the vehicle fleet on a work site.

According to one embodiment of the arrangement according to the invention, the predetermined vehicle operation condition is the allowed vehicle speed, and the allowed vehicle speed in the work site zone defined by the radio transmitter is preferably higher than the allowed vehicle speed in the work site area outside the work site zone not covered by the radio signals. Hereby, a vehicle in the work site zone can be driven with a non-restricted speed for an optimized productivity, whereas when the vehicle is driven outside the work site zone, the speed is limited for prioritizing safety.

According to a further embodiment of the arrangement, the radio transmitter has a relatively short range not exceeding 500 meters, preferably not exceeding 200 meters and often not exceeding 100 meters. A suitable effective coverage or range can be selected in the interval 30-100 meters, preferably 50-100 meters. By means of a short range transmitter, a size of the work site zone relevant to a work site can be selected. Further, the work site can be divided into different zones with high resolution and a plurality of the transmitters can be used for achieving the desired shape of the work site zone. In addition, this also makes the radio transmitter and receiver inexpensive.

According to a further embodiment of the arrangement, the arrangement comprises a pole to which the radio transmitter is attached, wherein the pole is movable and arrangeable in different positions at the work site. Hereby, the position of the radio transmitter as well as the position of the work site zone can be varied, and the work site zones of the work site can be adjusted or changed in case the conditions on the work site would change.

According to a second aspect of the invention, a device for controlling a vehicle on a work site according to claim 9 is provided.

By the provision of a device that comprises a radio receiver mountable on a vehicle for receiving radio signals from a radio transmitter arranged on a work site, wherein the device comprises a control unit connectable to the radio receiver, and the control unit is configured to provide control signals for controlling the vehicle according to a first predetermined vehicle operation condition when the radio receiver receives the radio signals from the radio transmitter, and according to a second predetermined vehicle operation condition when the radio receiver not receives the radio signals from the radio transmitter, the vehicle control can be differentiated with respect to different zones of a work site.

According to one embodiment of the device according to the invention, the first predetermined vehicle operation condition and the second predetermined vehicle operation condition are the allowed vehicle speeds when the radio receiver receives signals from the radio transmitter and when the radio receiver not receives signals from the radio transmitter, respectively, and the allowed vehicle speed associated with the first predetermined vehicle operation condition is preferably higher than the allowed vehicle speed associated with the second predetermined vehicle operation condition.

Hereby, a vehicle receiving the radio signals from the radio transmitter on the work site can be driven with a non-restricted speed for an optimized productivity, whereas if the vehicle is not receiving the radio signals the vehicle speed is limited for prioritizing safety. The allowed speed associated with the second predetermined vehicle condition may constitute a default value and is preferably limited to a relatively low speed, suitably below 20 km/h, and preferably below 15 km/h, and more preferably below 10 km/h, and often in the range 2-20 or 5-10 km/h.

Furthermore, according to further aspects of the invention, a system for a work site according to claim 15, a method for creating a work site zone on a work site according to claim 18, and a method for controlling a vehicle on a work site according to claim 19 are provided. The effects and advantages of these aspects of the present invention are largely analogous to those described above in relation to the first and second aspects of the present invention. It should also be stressed that any feature of the arrangement and/or the device according to the invention, or combinations thereof, can be used for the system and the methods according to the invention.

In addition, the invention relates to a computer program according to claim 20 and a computer readable medium according to claim 21.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
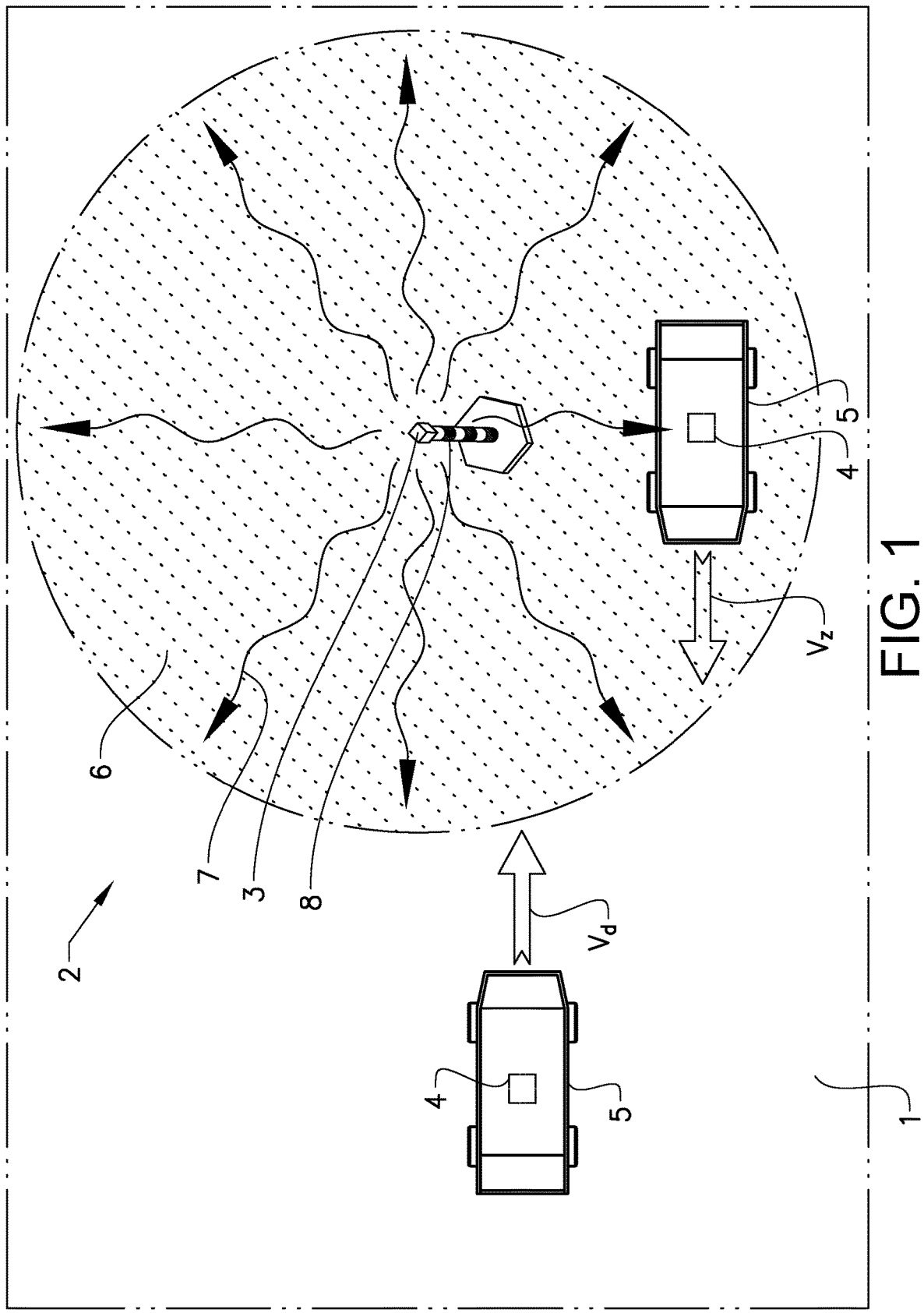
FIG. 1 is a schematic illustration of a work site provided with an arrangement according to one embodiment the invention.

FIG. 1 is a schematic illustration of a work site 1 provided with an arrangement 2 according to one embodiment the invention. The arrangement 2 comprises a radio transmitter 3 arranged at the work site 1 for transmitting signals 7 receivable by a radio receiver 4 arranged on a vehicle 5 at the work site 1. By the term "receivable" is meant that the radio receiver 4 is able to receive the radio signals 7 and generate electrical signals based on the radio signals provided that the receiver 4 is within the coverage of the radio transmitter 3.

The radio transmitter 3 is arranged to define a work site zone 6 of the work site 1 by means of the coverage of the radio signals 7 from the radio transmitter 3. This can be achieved in different ways. For example, a threshold value for the signal power is used and/or by using of a certain frequency band and/or by choosing the time during which the received signal is integrated. As soon as the invention is disclosed a person skilled in the art is able to choose various ways of delimiting and sizing the coverage in a proper way. In some applications this will not require that any real message or information has to be transferred from the radio transmitter 3 to the radio receiver 4 by the radio signals 7, but only the transmitted radio signals per se are used for defining the work site zone 6. In a preferred embodiment of the invention, the radio signals will however comprise and transfer some kind of message, code or number to be used by the radio receiver for verifying the identity of the radio transmitter, to eliminate or at least reduce the risk of receiving signals from an unauthorized source.

The frequency can be for example around 5 GHz or 2.4 GHz or 433 MHz or any other suitable frequency or frequency band. Even if the word "radio signals" has been used throughout the text, this is not meant to exclude other usable signals which may be are not defined as "radio signals". For example, micro waves could be used.

The created work site zone 6 has a predetermined vehicle operation condition for the vehicle 5 that is different in the work site zone 6 when the vehicle is receiving the radio signals 7 compared to outside the work site zone 6 when the vehicle is not receiving the radio signals 7. In other words; the transmitter is arranged to define the work site zone 6 such that the control of vehicles 5 can be differentiated for different areas of the work site 1. One or more vehicles 5 can be provided with such a receiver 4 to be subject to the differentiated control at the work site 1 based on whether or not the vehicle 5 is in the created work site zone 6. The vehicles 5 may have permission to travel both in the work site zone 6 and outside the work site zone or only in the work site zone. When receiving the radio signals 7 a predetermined vehicle operation condition can be applied in the work site zone 6 without transferring any information or instruction related to the vehicle operation condition. The only information that may have to be transferred by the radio signals is related to the identification of the radio transmitter 3.

In the embodiment illustrated in FIG. 1, the predetermined vehicle operation condition is the allowed vehicle speed Vz, Vd. In the work site zone 6 defined by the coverage of the radio transmitter 3 the allowed vehicle speed Vz is higher than the allowed vehicle speed Vd in the work site area outside the work site zone not covered by the radio signals 7. For example, the vehicle speed Vz in the work site zone 6 can be a non-restricted speed allowing the vehicle to be operated at maximal velocity, whereas the speed Vd outside the work site zone 6 can be limited to a velocity below 10 km/h, for instance.

The predetermined vehicle operation condition could also be another parameter than vehicle speed, that can be used alone or in combination with the vehicle speed operation condition. For example, in the work site zone, the vehicles can be allowed to move closer to each other, i.e. to be driven with a smaller distance between the vehicles, as compared to the work site area outside the work site zone. This in turn may give an increased productivity due to better utilization of roads, equipment, etc. Also any kind of sound or light from the vehicles could be differentiated by means of the defined work site zone.

Figure 2:
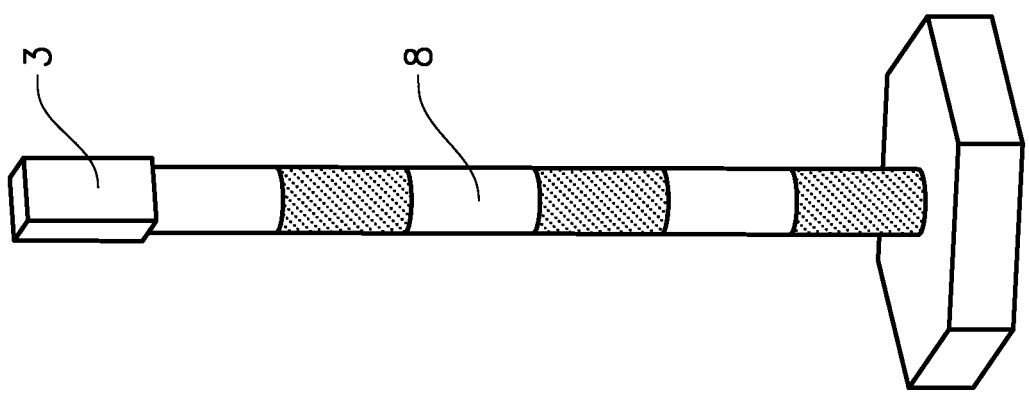
FIG. 2 shows a pole to which the radio transmitter of the arrangement illustrated in FIG. 1 is attached.

FIG. 2 shows a pole 8 to which the radio transmitter 3 of the arrangement 2 illustrated in FIG. 1 is attached. The radio transmitter 3 can be arranged in the top end of the pole 8. The pole 8 is arranged at the work site 1. The pole and radio transmitter can be arranged in a fixed stationary position at the work site. According to another embodiment of the invention the pole 8 is movable and arrangeable in different positions at the work site enabling the position of the radio transmitter 3 as well as the position of the work site zone 6 to be varied. Furthermore, the length of the pole giving the transmitter position height above ground can be adapted to the work site terrain and/or the position of the radio receiver 4 on the vehicles 5 for providing sufficient signal strength.

Generally, the coverage of the radio transmitter 3 has of course to be adapted to the size of the work site 1 and the desired size of the work site zone 6. The radio transmitter 3 has however preferably a relatively short range not exceeding 500 meters, preferably not exceeding 200 meters and often not exceeding 100 meters. A suitable effective coverage or range can be selected in the interval 50-100 meters. Even if a relatively large work site zone is to be created, instead of using a long range radio transmitter, often a better alternative is to use a plurality of radio transmitters arranged for obtaining the desired area of the work site zone. The use of several radio transmitters also enables the shape of the work site zone to be adapted to the current conditions on the work site.

Figure 3:
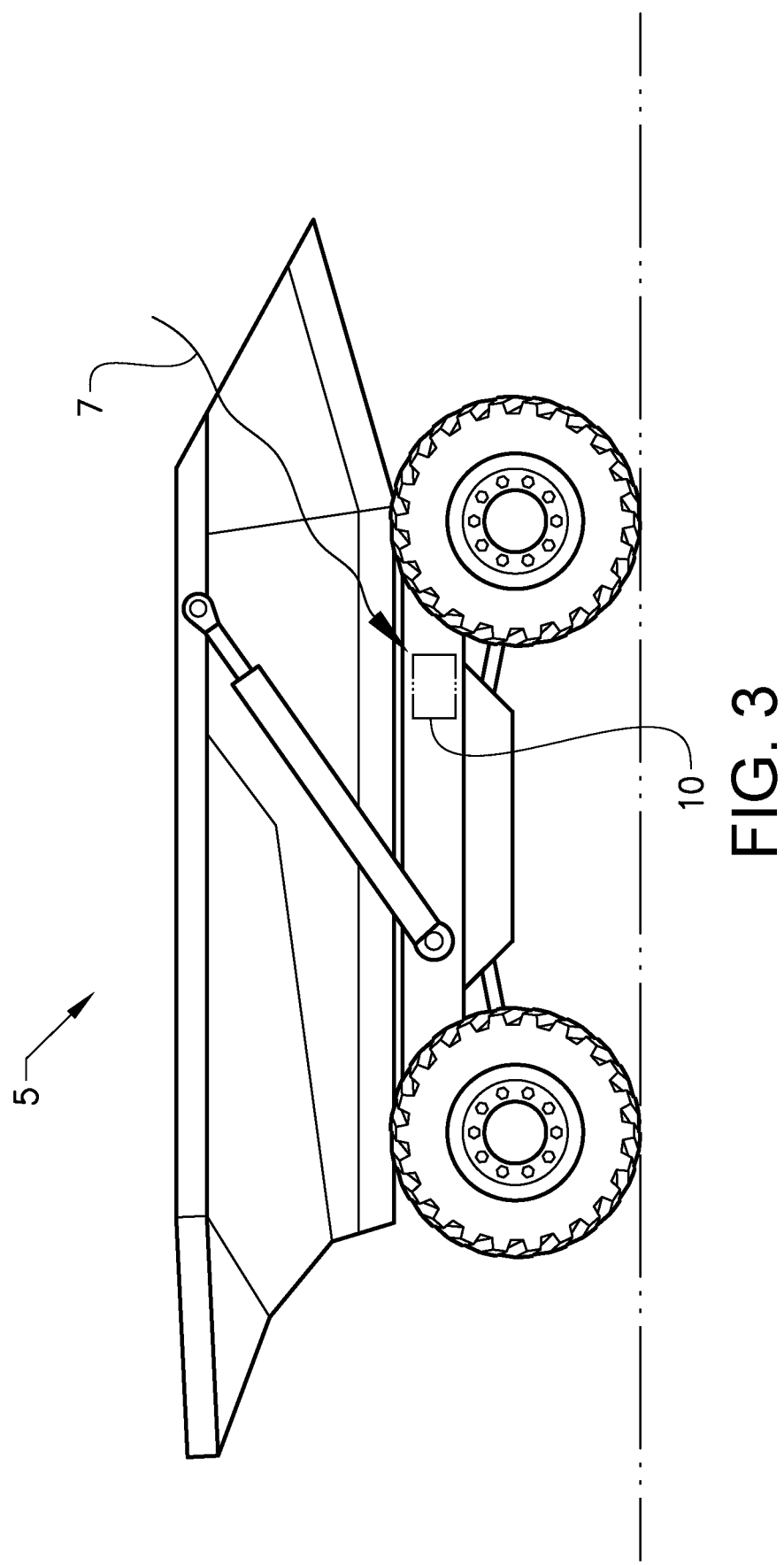
FIG. 3 shows a vehicle having a device for controlling a vehicle according to the invention.

FIG. 3 shows a working machine 5 in the form of an autonomous hauler. The hauler is to be considered as an example of a vehicle to which the invention can be applied. The hauler is provided with a device 10 for controlling the vehicle 5 on a work site. This device 10 is further explained below with reference to FIG. 4.

Figure 4:
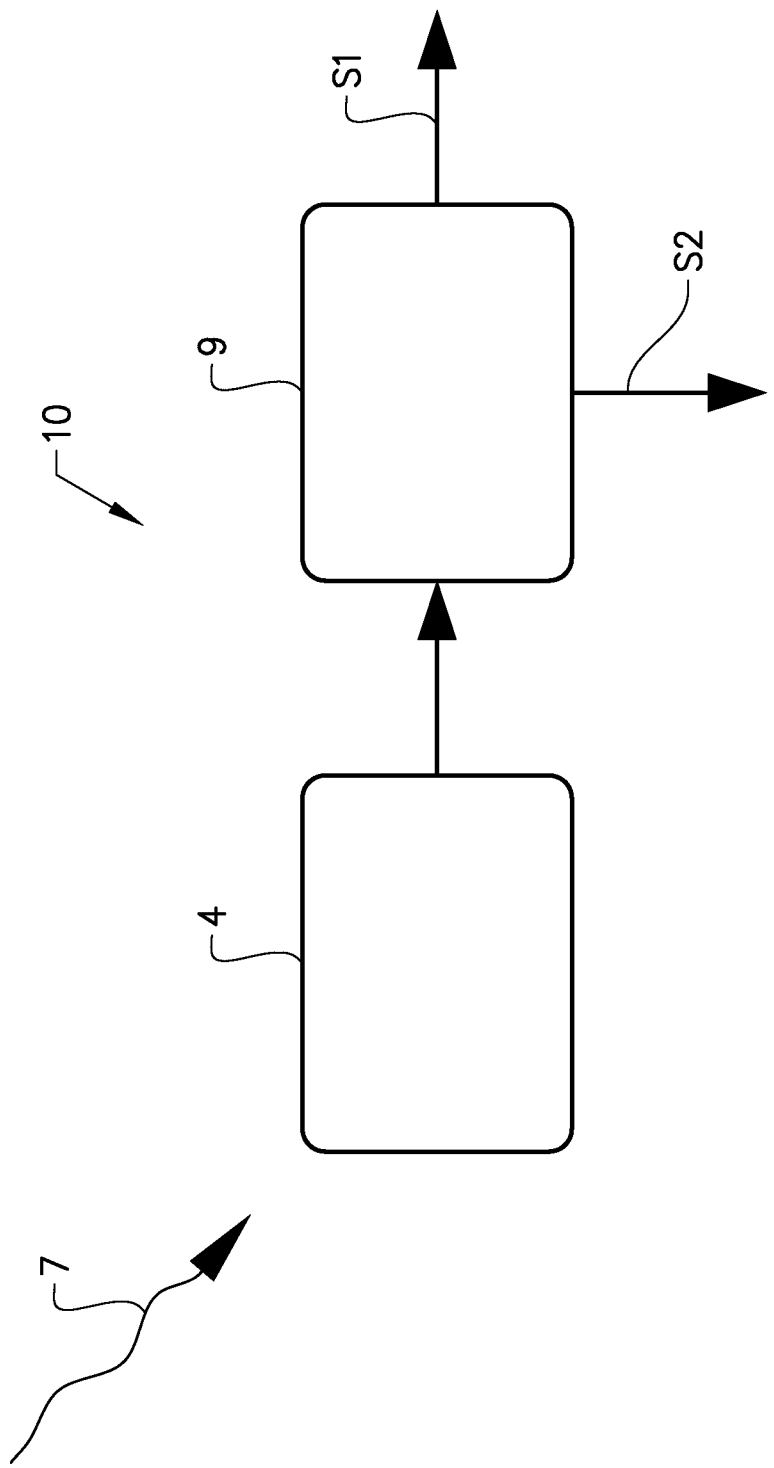
FIG. 4 shows the device illustrated in FIG. 3.

FIG. 4 shows one embodiment of the device 10 according to the invention. The schematically illustrated device 10 comprises a radio receiver 4 mountable on a vehicle 5 for receiving radio signals 7 from a radio transmitter 3 arranged on a work site 1. The device 10 further comprises a control unit 9 connectable to the radio receiver 4. The control unit 9 which is arrangeable on the vehicle 5 can be a separate unit communicating with a central control unit of the vehicle or be a part of the central control unit. The receiver 4 and the control unit 9 are preferably electrically connectable to each other, though also a wire-less connection which enables signals to be transmitted between the receiver and the control unit could be used. Alternatively, the control unit can also be integrated in the receiver. Although the control unit suitably comprises program code means for providing the requisite signals (for example the control signals of the method for controlling a vehicle as mentioned hereinafter), these signals could also be provided by means of electrical circuits only.

The control unit 9 is configured to provide control signals S1 for controlling the vehicle 5 according to a first predetermined vehicle operation condition when the radio receiver 4 receives the radio signals 7 from the radio transmitter 3, whereas the control unit 9 is configured to provide control signals S2 for controlling the vehicle 5 according to a second predetermined vehicle operation condition when the radio receiver 4 not receives the radio signals 7 from the radio transmitter 3. The first predetermined vehicle operation condition and the second predetermined vehicle operation condition are different from each other. The first predetermined vehicle operation condition and the second predetermined vehicle operation condition can be the allowed vehicle speeds $V_z$, $V_d$ when the radio receiver 4 receives signals from the radio transmitter and when the radio receiver 4 does not receive signals from the radio transmitter, respectively.

Thus, the speed can be differentiated for vehicles receiving the radio signals 7 as compared to vehicles not receiving the radio signals 7. The allowed vehicle speed $V_z$ associated with the first predetermined vehicle operation condition can be a non-restricted speed, enabling the vehicle 5 to be driven in full vehicle speed. The allowed vehicle speed $V_d$ associated with the second predetermined vehicle operation condition can be limited.

A default value of the speed $V_d$ is preferably used for the case the receiver 4 does not receive any signals from the radio transmitter 3. Such a default value could be a vehicle velocity which is considered to involve a very low safety risk to other vehicles and/or persons at the work site, for example 10 km/h or lower. Then the vehicle 5 can easily be braked to standstill if needed. This is very good from a safety perspective, since if the radio connection is lost for some reason the vehicle 5 can be controlled to be automatically braked to the default speed. Any malfunction of the radio transmitter 3 or any receiver 4 only means that the current vehicle(s) will be controlled to low speed operation, which may influence the productivity but not the safety.

When an autonomous hauler 5 for instance is travelling at very low speed, a person can easily get out of the way of the machine if necessary and the braking distance will be very short or close to zero. Even in the event of a collision between an autonomous machine and a manually operated working machine, such as a wheel loader, excavator, etc., at a very low speed there is no or very low risk for serve human injuries due to the collision.

On the other hand, the work site zone 6 can be a high-speed area where the vehicle can move in full speed $V_z$ for maximizing the productivity. This means that operator-controlled working machines or walking persons should usually not be permitted in the work site zone 6 or such presence should occur only in exceptional cases under certain conditions. In order to further increase the safety, the radio signals can be complemented with a sound or light that can be emitted in the work site zone or on the boarder thereof for warning people from entering the work site zone. Such warning signals can be emitted from one or more of the hereinabove mentioned poles.

Figure 5:
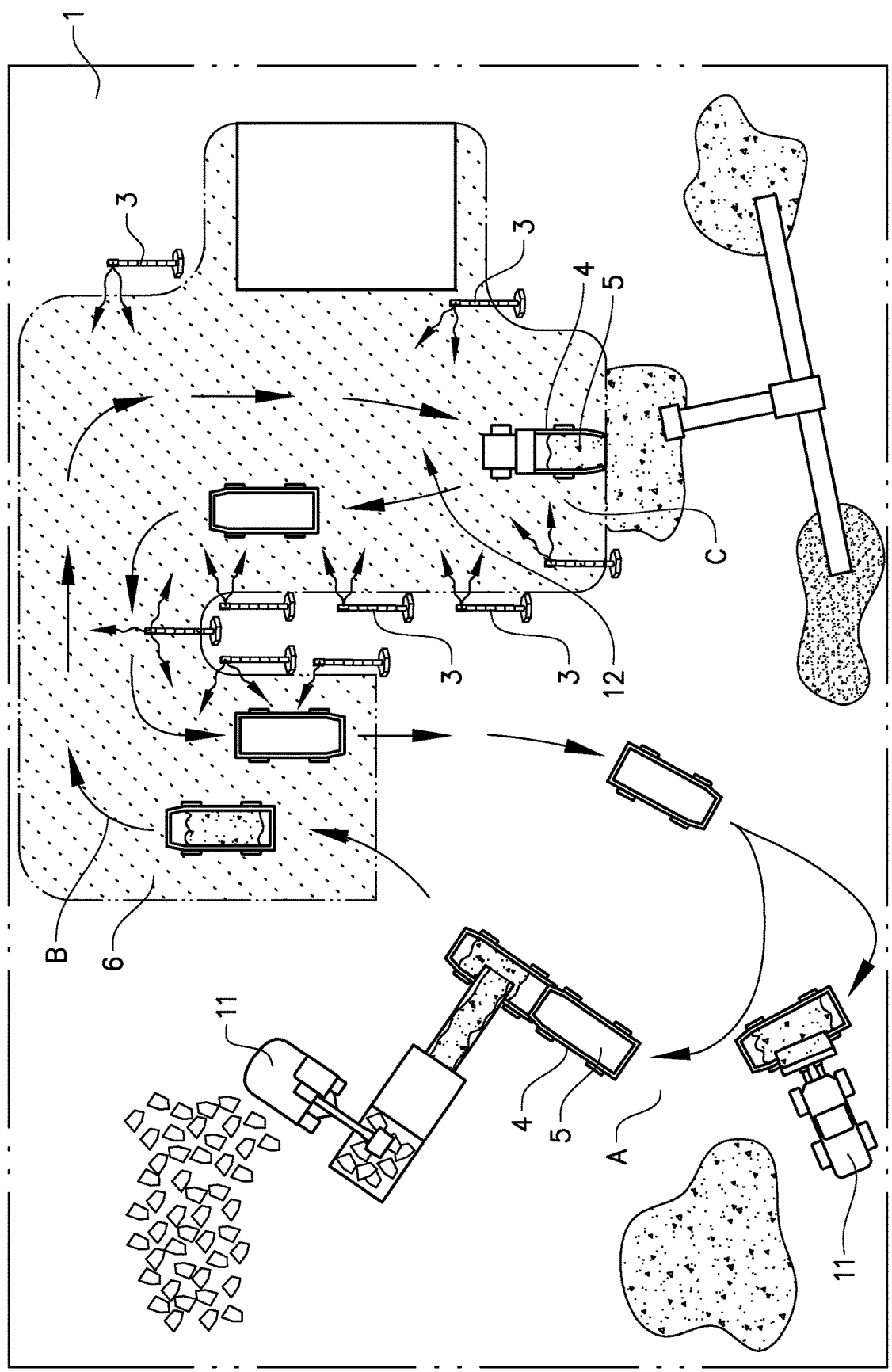
FIG. 5 is a schematic illustration of a work site provided with a system according to the invention.

FIG. 5 is a schematic illustration of a work site 1 provided with a system 12 according to the invention. The work site 1 is a quarry where stones are loaded onto autonomous haulers 5 at a position A, then transported along a route B and finally dumped by the haulers 5 at a position C. In the illustrated embodiment, the system 12 comprises a plurality of radio transmitters 3 arranged at the work site 1 for transmitting signals. The system also comprises radio receivers 4. Each of the plurality of autonomous haulers 5 is provided with a radio receiver 4 mounted on the hauler for receiving signals from the radio transmitters 3. It should be stressed that any feature or embodiment of the arrangement and/or the device 10 described herein, or combinations thereof, can be used in the system 12 according to the invention.

The radio transmitters 3 are arranged to define a work site zone 6 of the work site 1 by means of the coverage of the radio signals from the radio transmitters 3. The radio transmitters 3 are arranged spaced apart from each other for creating the work site zone 6. The work site zone 6 constitutes an area of the work site comprising route B for transportation of the material from the loading position A to the dumping position C. See the shadowed area within the dotted lines in FIG. 5.

A predetermined vehicle operation condition for the autonomous haulers 5 is different in the work site zone 6 when receiving the radio signals from any of the transmitters 3 as compared to outside the work site zone 6 when not receiving any radio signals from the transmitters 3. In the example embodiment illustrated in FIG. 5, the haulers 5 are allowed to move with full vehicle speed Vz in the work site zone 6, i.e. when travelling along the route B from the loading position A to the dumping position C. However, outside the work site zone, for example at the loading position A where also other vehicles or machines 11, such as wheel loaders, are present, the speed of the autonomous haulers is restricted, preferably to a maximal velocity of 5-10 km/h.

Figure 6:
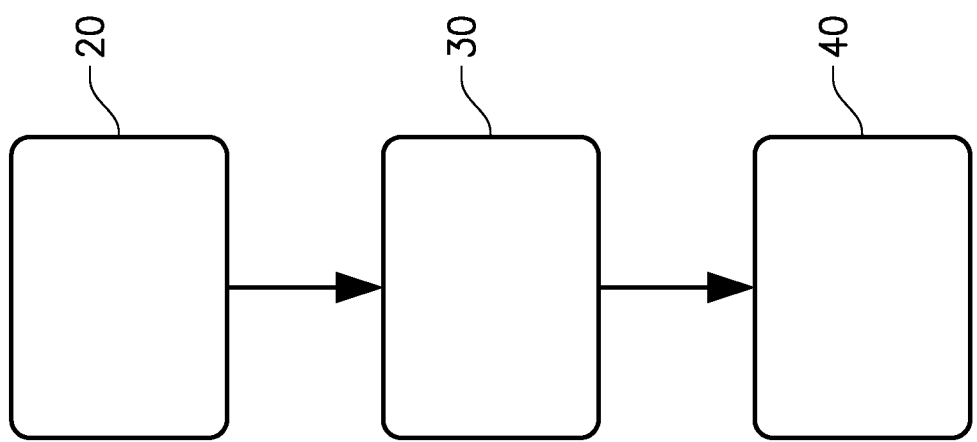
FIG. 6 is a flow chart of a method for creating a work site zone on a work site according to the invention.

The invention also relates to a method for creating a work site zone 6 on a work site 1. With reference to the flow chart in FIG. 6, this embodiment of the method comprises the step 20 of transmitting radio signals on the work site from a radio transmitter arranged on the work site, the radio signals being receivable by a radio receiver arranged on a vehicle at the work site, and defining 30 a work site zone of the work site by means of the coverage of the radio signals from the radio transmitter. Further, the method comprises the step of applying 40 a predetermined vehicle operation condition for the vehicle that is different within the work site zone when receiving the radio signals compared to outside the work site zone when not receiving the radio signals.

Figure 7:
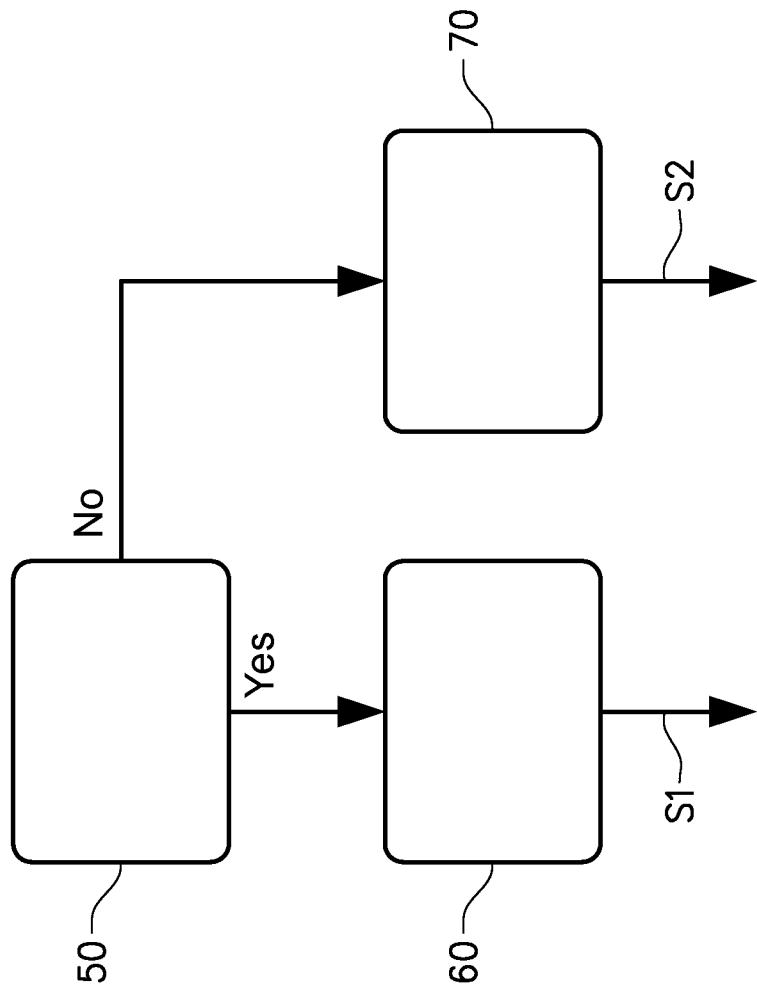
FIG. 7 is a flow chart of a method for controlling a vehicle on a work site according to the invention.

Furthermore, the invention relates to a method for controlling a vehicle on a work site. See flowchart in FIG. 7. As already described with reference to previous aspects of the invention, the vehicle comprises a radio receiver for receiving radio signals from a radio transmitter arranged on a work site and a control unit for providing control signals to the vehicle. The radio receiver and the control unit are connectable to each other. The method may comprise identifying 50 if radio signals are received. If YES the method comprises the step of providing 60 control signals S1 for controlling the vehicle according to a first predetermined vehicle operation condition when the radio receiver receives the radio signals from the radio transmitter. If NO the method comprises the step of providing 70 control signals S2 for controlling the vehicle according to a second predetermined vehicle operation condition when the radio receiver not receives the radio signals from the radio transmitter.

As soon as the invention is disclosed, other applications on work sites can be found, and different components can be designed and used by a person skilled in the art, such as for example other types of transmitter and receiver. It is to be understood that the present invention is not limited to the embodiments described above and illustrated in the drawings; rather, the skilled person will recognize that many changes and modifications may be made within the scope of the appended claims.

The invention claimed is:

1. An arrangement for a work site, the arrangement comprising:
a radio transmitter attached to a pole and arrangeable at the work site for transmitting signals receivable by a radio receiver arranged on an autonomously controlled vehicle at the work site, wherein the radio transmitter is arranged to define a work site zone of the work site based on a coverage of the radio signals from the radio transmitter, wherein autonomously controlled vehicles are allowed within the work site zone and operator-controlled vehicles are unallowed within the work site zone, wherein a predetermined vehicle operation condition for the vehicle is different in the work site zone when receiving the radio signals compared to outside the work site zone when not receiving the radio signals, wherein the pole comprises a warning signal arrangement for preventing operator-controlled vehicles to enter the work site zone.

2. An arrangement according to claim 1, wherein the predetermined vehicle operation condition is an allowed vehicle speed (Vz).

3. An arrangement according to claim 2, wherein the allowed vehicle speed (Vz) in the work site zone defined by the radio transmitter is higher than the allowed vehicle speed (Vd) in a work site area outside the work site zone not covered by the radio signals.

4. An arrangement according to claim 2, wherein the allowed vehicle speed (Vz) in the work site zone is a non-restricted speed.

5. An arrangement according to claim 1, wherein the radio transmitter has a relatively short range not exceeding 500 meters.

6. An arrangement according to claim 5, wherein the radio transmitter has a relatively short range exceeding 30 meters.

7. An arrangement according to claim 1, wherein the pole is movable and arrangeable in different positions at the work site enabling a position of the radio transmitter and a position of the work site zone to be varied.

8. An arrangement according to claim 1, wherein the radio signals transmitted by the radio transmitter comprise a message, code or number to be used as a verification of a radio transmitter identity by the radio receiver.

9. A system for a work site, the system comprising:
at least one radio transmitter attached to a pole and arrangeable at the work site for transmitting signals and at least one receiver mountable on an autonomously controlled vehicle at the work site for receiving signals from the radio transmitter, wherein the radio transmitter is arranged to define a work site zone of the work site based on a coverage of the radio signals from the radio transmitter, wherein autonomously controlled vehicles are allowed within the work site zone and operator-controlled vehicles are unallowed within the work site zone, wherein a predetermined vehicle operation condition for the vehicle is different in the work site zone when receiving the radio signals compared to outside the work site zone when not receiving the radio signals, wherein the pole comprises a warning signal arrangement for preventing operator-controlled vehicles to enter the work site zone.

10. A system according to claim 9, wherein the system comprises a plurality of radio transmitters arranged spaced apart from each other for creating the work site zone.

11. A method for creating a work site zone on a work site, comprising:
transmitting radio signals and a warning signals on the work site from a radio transmitter attached to a pole and arranged on the work site, the radio signals being receivable by a radio receiver arranged on an autonomously controlled vehicle at the work site,
defining a work site zone of the work site based on a coverage of the radio signals from the radio transmitter, wherein autonomously controlled vehicles are allowed within the work site zone and operator-controlled vehicles are unallowed within the work site zone, and
applying a predetermined vehicle operation condition for the vehicle that is different within the work site zone when receiving the radio signals compared to outside the work site zone when not receiving the radio signals.

\* \* \* \* \*